A. W. WALL.
ENGINE PISTON AND CONNECTING ROD.
APPLICATION FILED DEC. 27, 1918.

1,386,144.

Patented Aug. 2, 1921.

Inventor:-
Arthur William Wall.
By:- B. Singer, atty.

UNITED STATES PATENT OFFICE.

ARTHUR WILLIAM WALL, OF SHELDON, NEAR BIRMINGHAM, ENGLAND.

ENGINE-PISTON AND CONNECTING-ROD.

1,386,144.  Specification of Letters Patent.  Patented Aug. 2, 1921.

Application filed December 27, 1918. Serial No. 268,544.

*To all whom it may concern:*

Be it known that I, ARTHUR WILLIAM WALL, a subject of the Kingdom of Great Britain, residing at "The Laurels," Lyndon End, Sheldon, near Birmingham, in the county of Warwick, England, have invented certain new and useful Improvements in or Relating to Engine-Pistons and Connecting-Rods, of which the following is a specification.

This invention comprehends certain improvements in or relating to engine pistons and connecting rods, and comprises a piston and connecting rod combination in which the connecting rod is provided with an external pivotal bearing surface adapted to coöperate with a female bearing surface provided in a stamped or equivalently manufactured piston, and in which the piston is made up from parts formed by stamping, pressing, or the like, that part of the piston bearing surface which functions during the power stroke being pressed, stamped, or the like in one of the parts forming the piston body. Advantageously the piston body comprises two sections, each of which is an essential part of the piston irrespective of its connection with the connecting rod, and the female piston bearing surface is provided partly in one of said sections and partly in the other.

The present invention further comprises the manufacture by a stamping, pressing, or equivalent process of a piston, the body of which consists of two cup-like members secured base to base. The axis of pivotal connection between the piston and the connecting rod is advantageously located in the plane in which the bases of the cup portions meet, and bearing formations for said pivotal connections may be formed in said bases in the stamping, pressing, or equivalent process. The head of the piston consists of the base of a third cup-like member which closes one of the cup portions which form the body of the piston, and in the inclosed chamber thereby provided, asbestos or other light non-heat-conducting material may be incorporated which relieves the joint between the connecting rod and piston from the heat of the explosion.

In order that this invention may be clearly understood and readily carried into practice, reference may be had to the appended explanatory sheet of drawings, upon which:—

Figure 1:
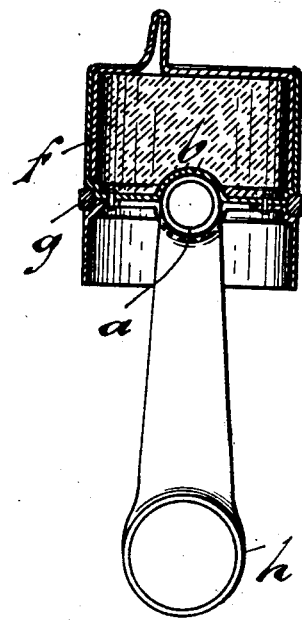
Figure 1 illustrates in sectional elevation a piston and connecting rod according to the present invention.
Figure 2:
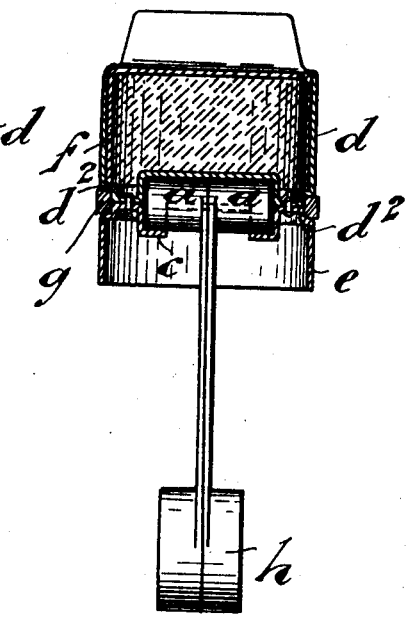
Fig. 2 illustrates in sectional elevation the piston and connecting rod shown in Fig. 1, the aspect of elevation being at right angles to the figure last mentioned.
Figure 3:
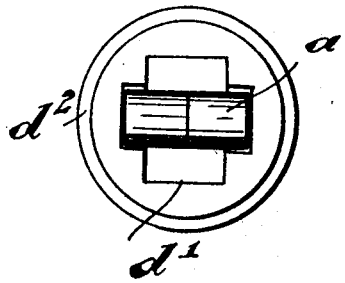
Fig. 3 is a plan of the lower part of the piston shown in Figs. 1 and 2, with the connecting rod in position.
Figure 4:
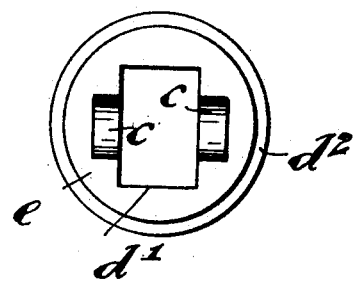
Fig. 4 is a plan of the lower part of the piston shown in Figs. 1 and 2 with the connecting rod removed.

In a convenient embodiment of the present invention, and referring firstly to Figs. 1 to 4, the connecting rod is at its one extremity formed with two cylindrical projections, $a$, $a$, the axes of which are located transversely to its length, these cylindrical projections being alined with each other. Each half of the connecting rod is manufactured from a strip of metal by subjecting it to a stamping or pressing process by which at each end a hollow cylindrical boss $a$, $h$ is formed. This boss may be formed by cupping the extremities of the strip and afterward removing the bases of the cupped portions, or, alternatively, perforations may be first formed in the strip and the parts of the metal encircling the perforations may then be stamped, pressed, or otherwise equivalently worked to the desired cylindrical form. When two such stampings are placed web to web a connecting rod is provided involving a shank portion composed of two webs located in close contiguity and having at each end alined upwardly extending cylindrical hollow bosses. Longitudinal flutings may if desired be formed in the shank portions of the stampings. At the small end of the connecting rod the bosses $a$ are adapted to have an external bearing.

The piston is divided transversely in a plane containing the axis of pivotal connection with the connecting rod. At this plane of division semi-cylindrical concavities $b$, $c$ are provided in the upper and lower parts of the piston. These semi-cylindrical concavities terminate at a suitable distance from the circumference of the piston with webs at right angles to the axes of said concavities, and they are adapted to form a cylindrical chamber of dimensions coinciding with that of the bosses $a$, $a$ upon the connecting rod. In the one section of the piston an aperture $d^1$ is provided, through which the shank of the connecting rod passes. This aperture is suitably elongated to permit of the oscillation of the connecting rod. The piston may be composed of stampings which comprise cupped members $d$, $e$ arranged base to base and suitably secured together, the cavities $b$, $c$ being provided in the respective bases of the cupped members $d$, $e$ so that their axes lie in the plane of juncture of the bases of the cupped members $d$, $e$. These cupped members $d$, $e$ may be manufactured from sheet metal or other blanks. The said cupped members have cylindrical walls and flat bases and form the body of the piston. Around the edge of each base, stepped formations $d^2$ are formed in the stamping process. When two cupped members thus manufactured are placed base to base, the stepped portions $d^2$ form an annular recess for the reception of a piston ring $g$.

The head of the piston consists of a third cupped member $f$ manufactured by pressing, stamping, or the like from a suitable blank, the external diameter of this third cupped member being adapted to correspond with the internal diameter of one $d$ of the two first-described cupped members so that said third cupped member may be inserted to close the upper of the two first-described cupped members. The base of said third or internal cup member may be formed to any desired shape to direct the ingoing mixture when entering the cylinder in order to promote efficient scavenging. Within the inclosed space formed by the insertion of the third or internal cup member, light non-heat-conducting material $i$ may, as hereinbefore mentioned, be included. The cup member $f$ may be retained in position by swaging over the edge of the cup member $d$ and or by spot, electric, or other welding. The two cup members $d$, $e$ of the piston may be connected together by riveting, or spot, electric, or other welding.

What I claim as my invention and desire to secure by Letters Patent is:—

1. A piston, comprising a pair of cup members obtained by stamping, pressing or the like and secured base to base, the bases of said cup members being provided with bearing formations to arrange the axis of pivotal connection between the piston and the connecting rod in the plane in which the cup bases meet.

2. A piston, comprising a pair of cup members obtained by stamping, pressing or the like and secured base to base, the bases of said cup member being provided with bearing formations to arrange the axis of pivotal connection between the piston and the connecting rod in the plane in which the cup bases meet, and a third cup member constituting the piston head and closing one of said first mentioned cup members forming the body portion of the piston.

In witness whereof I have hereunto set my hand in the presence of two witnesses.

ARTHUR WILLIAM WALL.

Witnesses:
 ARTHUR H. BROWN,
 EDGAR N. WHEELER.